Figure 1:
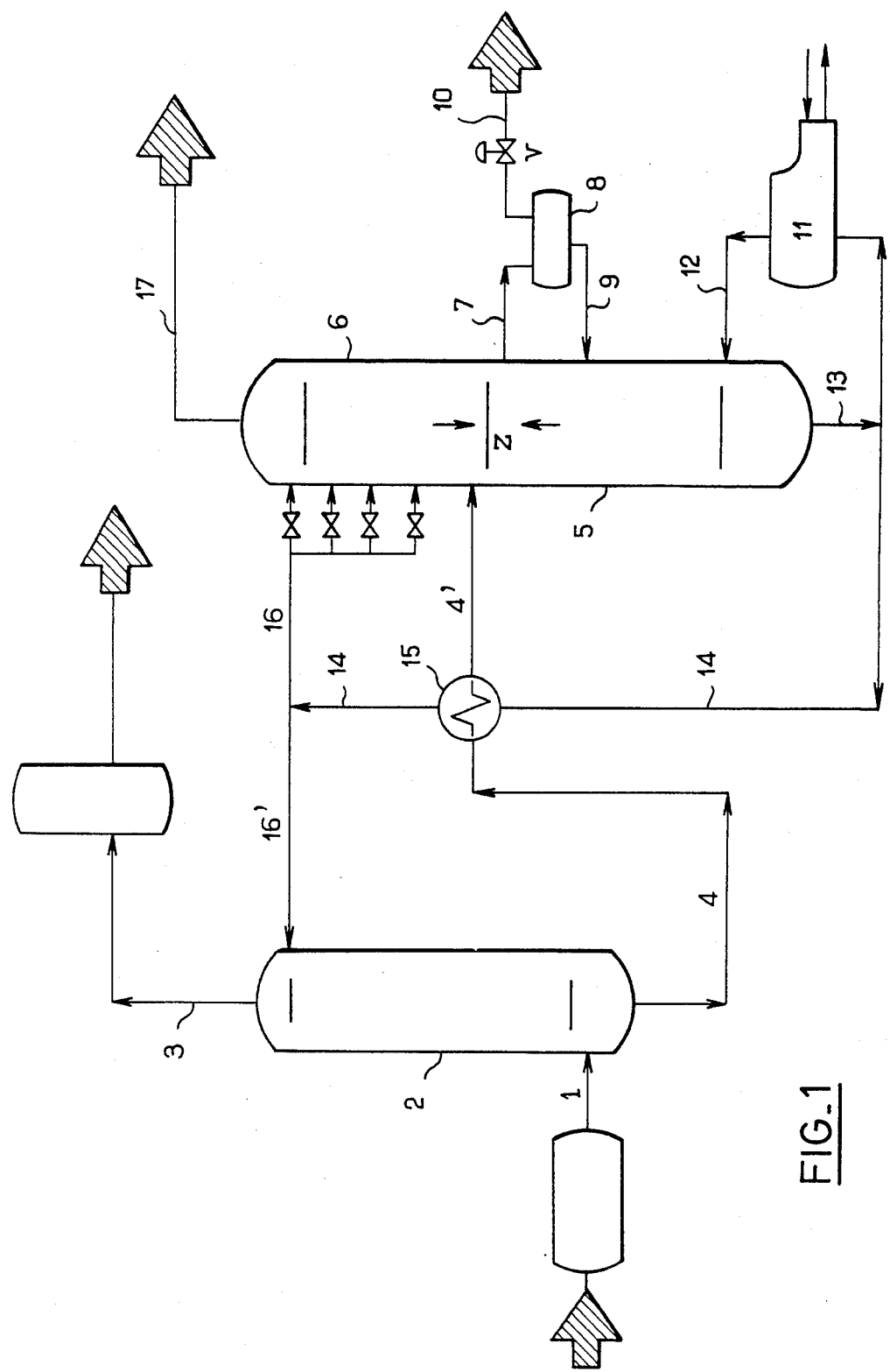

United States Patent [19]

Oliveau et al.

[11] Patent Number: 4,519,991
[45] Date of Patent: May 28, 1985

[54] ENRICHMENT IN HYDROGEN SULPHIDE OF GASES CONTAINING IT

[75] Inventors: Olivier Oliveau, Lescar; Claude Blanc, Pau, both of France

[73] Assignee: Societe Nationale Elf Anquitaine, France

[21] Appl. No.: 565,029

[22] Filed: Dec. 21, 1983

[30] Foreign Application Priority Data

Dec. 21, 1982 [FR] France .................. 82 21410

[51] Int. Cl.³ .................. B01D 53/34
[52] U.S. Cl. .................. 423/220; 423/226; 423/228; 423/229; 55/73; 422/168; 422/170; 422/234; 422/235
[58] Field of Search .......... 423/220, 222–224, 423/226–229, 232, 233; 55/73; 422/168, 170, 234, 235

[56] References Cited

U.S. PATENT DOCUMENTS

| | | | |
|---|---|---|---|
| 3,819,816 | 6/1974 | Wunderlich et al. | 423/238 X |
| 4,289,738 | 9/1981 | Pearce et al. | 423/228 |
| 4,299,801 | 11/1981 | Lynn et al. | 423/228 |
| 4,430,316 | 2/1984 | Ranke et al. | 423/573 R |

FOREIGN PATENT DOCUMENTS 2379447  8/1978  France .

*Primary Examiner*—Earl C. Thomas
*Attorney, Agent, or Firm*—Ostrolenk, Faber, Gerb & Soffen

[57] ABSTRACT

Improvement in the enrichment of a gas in hydrogen sulphide, comprising selective absorption by a liquid in a primary absorption zone, regeneration of the liquid by heating and/or stripping by an inert gas with liberation of the gases absorbed and recovery of a fraction of the liberated gases, the remainder being subjected to a second absorption in a secondary absorption zone by a new or regenerated absorbent liquid identical with that used in the primary absorption zone; in one and the same zone of operation, common to the regeneration and the secondary absorption zones, there occur simultaneously: arrival of the liquid from the first absorption, movement of the gases liberated during regeneration, flow of the liquid derived from the secondary absorption and discharge of a fraction of the liberated gases enriched in $H_2S$.

10 Claims, 3 Drawing Figures

FIG_1

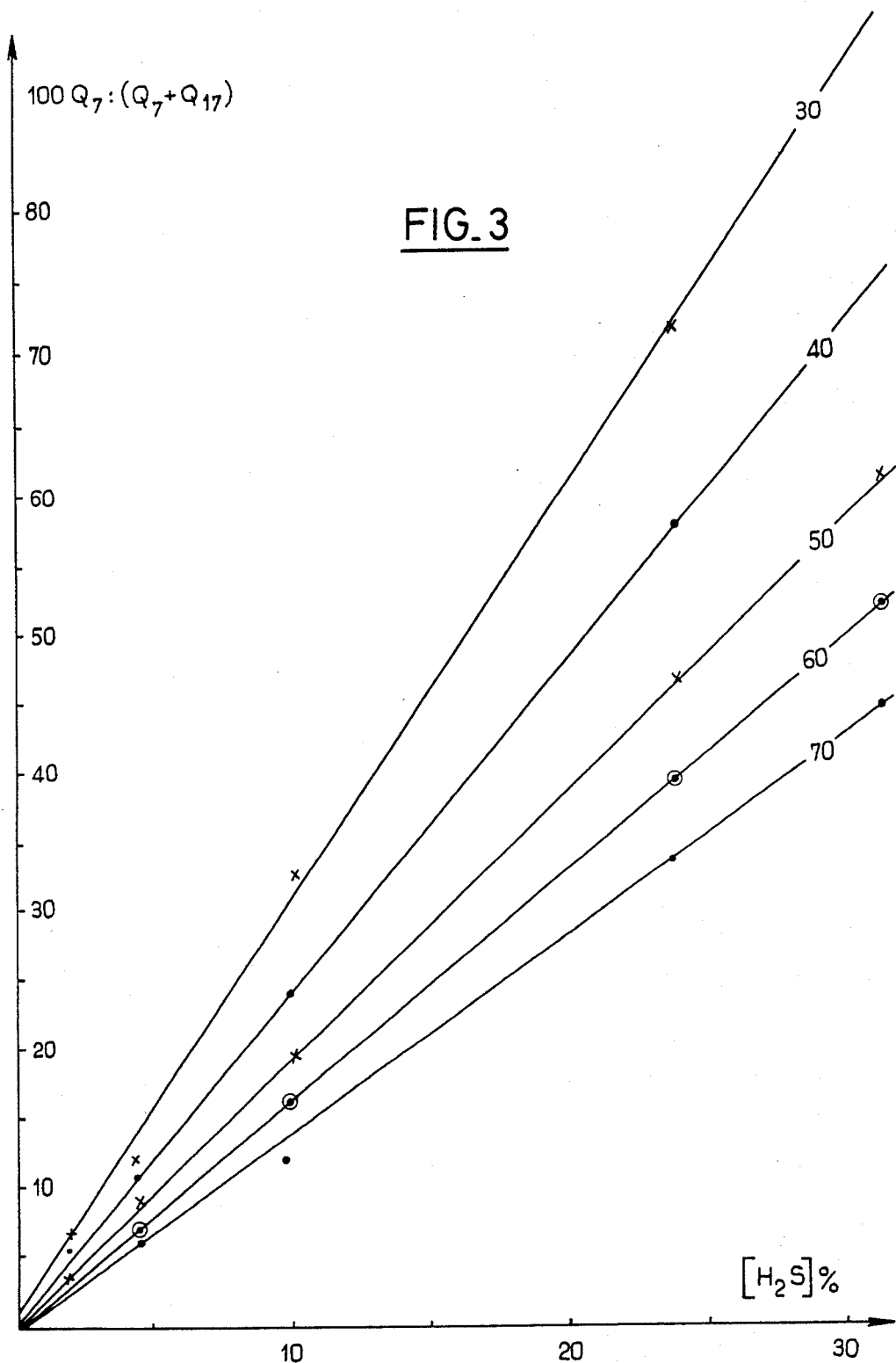

ENRICHMENT IN HYDROGEN SULPHIDE OF GASES CONTAINING IT

The invention relates to the enrichment in hydrogen sulphide of various gases which contain this compound. It relates more particularly to gases containing both $H_2S$ and $CO_2$ in conjunction with other gases, which can be hydrocarbons, CO, hydrogen etc. The treatment of synthesis gases obtained by the gasification of heavy petroleum cuts is an example. An important application of the invention is the enrichment of a mixture of $CO_2$ with $H_2S$, known under the name "acid gas", in order to obtain a mixture containing more than 35% $H_2S$ for the manufacture of sulphur according to the CLAUS process.

The technique of treatment of various gases containing hydrogen sulphide with a view to the elimination of this compound is well known in industry; these include the cases of the elimination of $H_2S$ from gases obtained by the combustion or gasification of petroleum or carbon, refinery gases, town gas, natural gas, and that obtained from coke ovens or water gas. This elimination is often conducted so as to recover the hydrogen sulphide in the form of a gas which is more concentrated in $H_2S$, which is useful industrially.

The process generally carried out at the present time consists of absorption of $H_2S$ and $CO_2$ by one or more absorbent liquids selective for $H_2S$; the liquid is then regenerated, in order to liberate the desired gases, and is used again. As is known, the absorbents can be constituted by physical solvents, for example methanol, the dimethylether of polyethylene glycols, hexamethylphosphorotriamide, N-methyl-pyrrolidone, sulpholane and others. Processes frequently employed at the present time utilize aqueous solutions of chemical reactants and in particular aqueous solutions of alkanolamines, particularly methyl-diethanolamine, triethanolamine, diisopropanolamine, etc. Use is also made of mixtures of these two kinds of absorbents, for example mixtures of water, diisopropanolamine and sulpholane, mixtures of water, methyl-diethanolamine and sulpholane and mixtures of water, methanol and one or more amines, such as methyl-diethanolamine, diethanolamine, monoethanolamine and diisopropylamine. The method of operation, which has become standard, consists of passing the gas to be treated in countercurrent with the aqueous solution of the absorbent in one or more absorbers, so as to retain in the liquid the maximum amount of the $H_2S$ and the minimum amount of the $CO_2$ present. The liquid then passes into a regenerator, where it is heated to a sufficiently elevated temperature or/and is stripped by an inert gas to liberate the gases previously absorbed. The absorbents are selected from the absorbents mentioned above, which selectively retain the $H_2S$ in the gases treated and consequently permit enrichment in $H_2S$ of the gases liberated by the regenerator. When the separation of the gases desired is not sufficient, at the outlet from the generator, the operations are repeated, that is the gases are again passed into a second absorber, from which they go into a regenerator which can be of the same type as the previous one; in this case, the gases leaving the secondary absorber can be recycled to the first absorber or discharged to an incinerator or to a converter unit for CLAUS sulphur.

One of the difficulties which arises in this technique is due to fluctuations in the content of $H_2S$ in the gases initially treated; when this content falls, the concentration of $H_2S$ in the enriched gases is no longer sufficient. To overcome this disadvantage, it has been proposed to withdraw only a part of the enriched gases at the outlet from the generator and to pass a fraction of greater or lesser size to a secondary absorber. Such a process is described in French Patent Specification No. 2,379,477: FIG. 1 of this document shows diagrammatically such an operation. Other variants have been proposed in the technical literature relating to this matter.

Despite the improvements made, the process of enrichment of gases in $H_2S$ always leaves something to be desired, mainly because it is difficult to operate an enrichment to the desired degree in the same apparatus, if the $H_2S$ content of the initial gas varies considerably. Also, the standard processes do not allow gases containing more than 35 to 40% $H_2S$ to be obtained from gas which contains $H_2S$ and $CO_2$ in a molar ratio $H_2S:CO_2$ lower than about 0.1, without employing extremely voluminous installations with multiple absorbers and regenerators.

It is this disadvantage which the present invention eliminates; it allows any desired rate of enrichment, even starting from gas containing $H_2S$ and $CO_2$ in a molar ratio $H_2S:CO_2$ very much below 0.1, so as to produce gaseous mixtures containing 40% $H_2S$ or even higher.

The process according to the invention also allows rapid evaluation, from the analysis of the initial gases, of the rate of withdrawal of the final acid gas rich in $H_2S$; in other words, the invention allows immediate knowledge, without the investigations necessary in the known art, of the proportion of final acid gas which can be withdrawn in order to obtain the desired $H_2S$ concentration.

The process according to the invention consists in subjecting the initial gas containing $H_2S$ and $CO_2$ to absorption by an absorbent liquid selective for $H_2S$ in a primary absorption zone, transferring the liquid containing the absorbed compounds to a zone for regeneration by heating and/or stripping with an inert gas, withdrawing a fraction of the gases thus liberated and passing the remainder to a second absorption zone, supplied with a new or regenerated absorbent liquid. This process is characterized in that the regeneration zone and that of the second absorption constitute a common zone where the four following operations take place simultaneously: introduction of the charged liquid derived from the first absorption, arrival of substantially all of the gases liberated by regeneration, flow of the secondary absorption liquid and discharge of a predetermined fraction of the acid gases enriched in $H_2S$.

While, according to the prior art, the introduction and discharge of the liquids and gases indicated above occur at distinct points, often widely separated from one another, according to the invention they take place as close as possible to one another, in a common part of the regeneration and second absorption zones. This measure leads to an efficiency such that it becomes possible to obtain very high enrichment factors, for example 130 times, whatever the $H_2S$ content of the initial gas and the value of the molar ratio $H_2S:CO_2$ in the gas and moreover with the same apparatus, although according to the prior art it was necessary to add supplementary absorbers. By "enrichment factor" is meant the ratio of the molar concentration of $H_2S$ in the acid fraction of the gas withdrawn to the molar concentration of $H_2S$ in the fraction of the acid gas to be purified and, by "acid fraction", the $H_2S$ and $CO_2$ combined. It can thus be seen that the enrichment calculated according to Example 1 of the foregoing patent is 0.3 to 22% $H_2S$ for a molar ratio $H_2S:CO_2$ of 4% in the initial gas, while according to the invention, it is possible to go up to 40% starting with 0.33% of $H_2S$ in the initial gas with a comparable molar ratio $H_2S:CO_2$ or even with 0.25% $H_2S$ in the initial gas with a molar ratio $H_2S:CO_2$ of 1%, as shown by the Examples given below.

As the $H_2S$ enrichment factor of the gas withdrawn is dependent upon the rate of withdrawal of this gas, the invention provides a convenient and rapid means for determining this rate, that is the proportion of the final gas to be retained in the circuit with respect to the total volume of the gas liberated by the regeneration.

Thus, according to the invention, when it is desired to multiply by n the concentration of $H_2S$ in the acid fraction, namely $H_2S+CO_2$, contained in the absorbent to be regenerated, it is suitable to withdraw from the regeneration zone only a fraction of the gas enriched in $H_2S$ which is substantially equal to $1/n$ of the total amount of the acid gas contained in the absorbent to be regenerated discharging from the primary absorption zone. This linear relation can be regarded as surprising, because it is not found in the prior art; it is explained however by the very high efficiency of the process according to the invention, due to the common zone of the regeneration and the secondary absorption described above.

The above mode of regulation is particularly suitable when the absorption liquid is constituted by an aqueous solution of methyl-diethanolamine, but it also applies equally with a very good approximation when other absorbents selective for $H_2S$ are utilized.

The apparatus for carrying out the process according to the invention comprises at least one primary absorber receiving at the bottom the initial gas to be treated and at the top the absorbent solution derived from a regenerator. In the usual manner, the liquid absorbent withdrawn at the base of the absorber passes into a thermal exchanger in order to recover the heat from the absorbent leaving the base of the regenerator. The liquid at the base of the absorber, thus reheated, is introduced at a certain height into the regenerator, which is connected to a secondary absorber. The apparatus is characterized in that, substantially at the level where the liquid from the primary absorber is introduced, the upper part of the regenerator functions as a secondary absorber. In contrast to all the similar known installations, there is no solution continuously passing between the regenerator and the secondary absorber.

On the other hand, a median region of the regenerator-secondary absorber assembly has this new characteristic that it is the location of four different simultaneous functions: (1) introduction of the charged absorbent liquid, (2) rising movement of the gases liberated in the regenerator, (3) discharge of a fraction of this gas and (4) downward flow, over all or a large part of the cross-section of the apparatus, of the absorbent liquid used in the secondary absorber. As seen above, this special arrangement leads to a considerably increased efficiency in the apparatus according to the invention.

It will be understood that the heights and the numbers of plates of the absorbers and the regenerator are calculated in the appropriate fashion for the industrial conditions of the operations envisaged.

The invention is described below in relation to one of its non-limitative embodiments.

Figure 2:
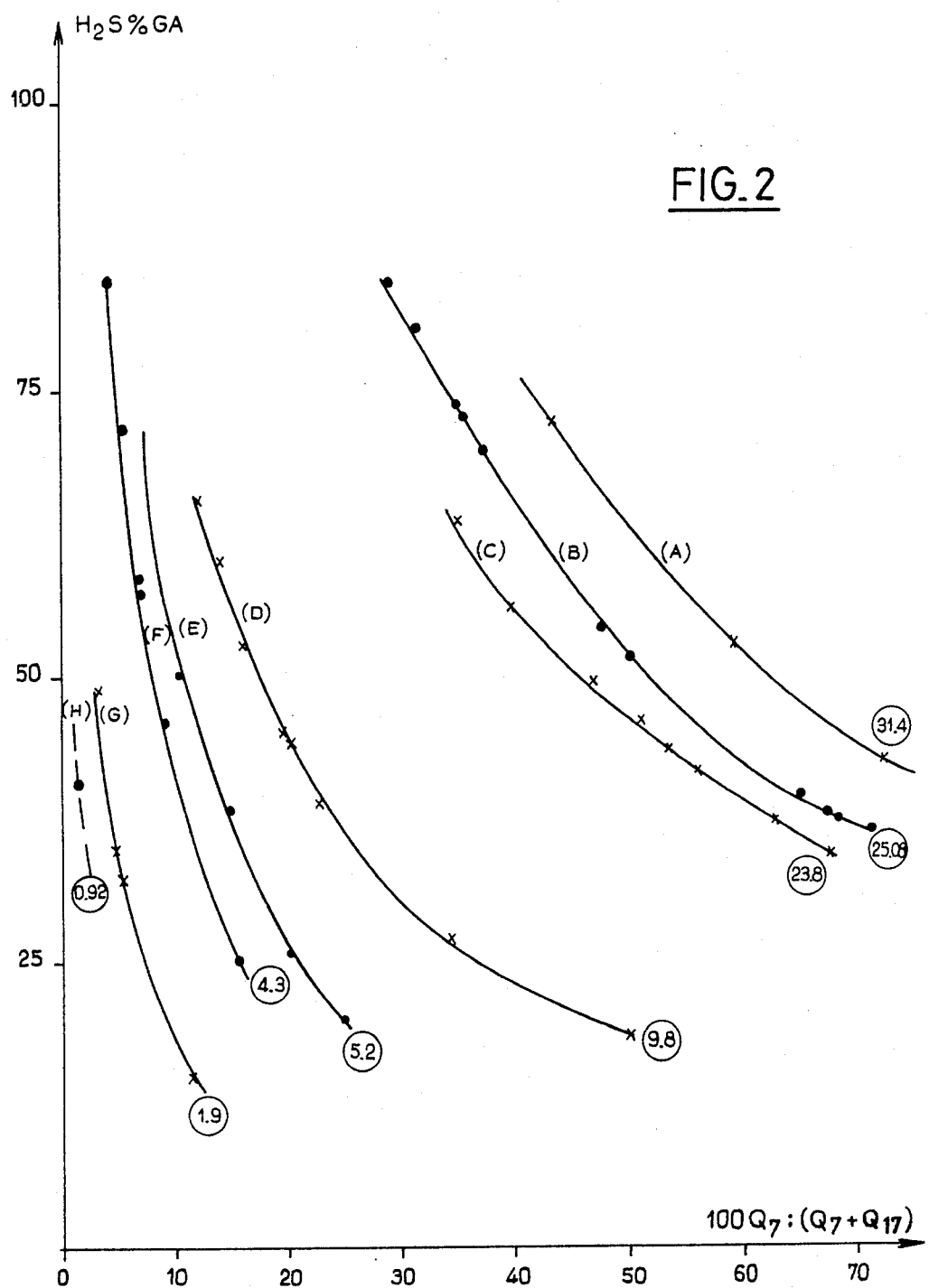

The accompanying drawings show:

FIG. 1, a diagram of an apparatus according to the invention;

FIG. 2, a graph comprising curves giving the molar percentage of $H_2S$ in the gas withdrawn as a function of the rate percentage of withdrawal of this gas for various $H_2S$ contents in the acid gas (acid fraction) contained in the absorbent to be regenerated;

FIG. 3, a graph for determining the rate of withdrawal for obtaining the desired molar $H_2S$ content in the acid gas withdrawn, by knowing the molar $H_2S$ concentration of the acid gas contained in the liquid derived from the first absorber.

In FIG. 1, reference 1 designates the introduction of the initial gas to be treated, containing $H_2S$ and $CO_2$, at the base of the standard absorber 2, comprising for example 10 to 25 plates. The gases not absorbed leave at 3, eventually passing through a complementary fine purification stage, not indicated with any reference, and are utilized for various manufactures or discharged to utilization plants. The liquid absorbent, which has dissolved substantially all of the $H_2S$ and part of the $CO_2$ in the absorber 2, leaves the latter through the duct 4; this leads to an exchanger 15 where the liquid is heated by indirect heat exchange with the absorbent arriving via 13 and 14 from the regenerator 5. After the exchanger 15, the hot part 4' of the duct 4 leads to the regenerator 5, in a region Z of the latter where the absorbent function commences at the part 6. At a level adjacent that of the introduction from 4', the outlet 7 for the withdrawn gas is located; this is where withdrawal occurs of a fraction of the gases liberated by heating at the base of the regenerator 5 (circuit 11-12). The usual components are shown in the drawings of a circuit for withdrawal of a gas from a liquid; the outlet 7 discharges into a condenser 8, from which the condensed liquid returns via 9 to the regenerator 5, while the cooled gas leaves the apparatus via 10, the regulating valve v allowing the feed rate to be varied.

The region Z of the interior of the regenerator in the part located between the inlet of 4' and the outlet of 7 has considerable importance; it is here that contact occurs between the absorbent to be regenerated, discharging from the duct 4', the absorbent introduced into the absorber 6 via the duct 16, preferably having an inlet adjustable in position, as shown in the drawing, and which at this level is charged with the acid gas, and the whole of the acid compounds desorbed in the regenerator 5, a fraction of which is withdrawn via the outlet 7. Preferably, the inlet 4' is connected to the first plate, at the base of the absorber 6, while the outlet 7 is located between this plate and the subjacent plate, viz. the last in the regenerator. In contrast to the arrangements in known apparatus, there is direct mixing, even inside the special zone Z common to the regenerator and the secondary absorber, between the various liquid and gaseous streams. As there is preferably no separation between the regions 5 and 6, the action of these various streams takes place over the whole transverse section of the apparatus, which produces a remarkable efficiency. At the upper outlet 17 of the absorber 6, the $H_2S$ is found in minimal proportions.

Distribution of the absorbent stream regenerated between the two absorbers, by the branches 16 and 16' of the duct 14, is adjusted according to the operative requirements.

In an apparatus such as that just described, a series of purifications of various gases of variable $H_2S$ contents has been effected. The regenerator 5 had 18 plates and the secondary absorber 6 had 16.

EXAMPLE 1

The treatment is carried out on an initial gas constituted by a crude synthesis gas containing 1.2% $H_2S$, 24.6% $CO_2$, 74.2% $CO+H_2$.

The absorbent is constituted by an aqueous solution of 4 moles per liter of methyl-diethanolamine.

A pressure of 57 bars operates in the absorber 2, the base of which is at 72° C. This absorber comprises 25 plates. The conditions and results of this operation are set out in Table 1. It can be seen that, at the outlet 7, a gas containing 65% $H_2S$ is withdrawn, in contrast to 1.2% in the initial gas. As regards the synthesis gas leaving at 3, it contains only 10 vpm of $H_2S$ and 96.2% $CO+H_2$, which makes it suitable for the manufacture of methanol.

To obtain a 65% content in the gas withdrawn at 7, this withdrawal was limited to 7.8% of the acid gas available in the absorbent to be regenerated, that is $(2100:26840) \times 100$; this regulation is derived graphically from FIGS. 2 and 3.

TABLE 1

| FIG. 1 | $H_2S$ content | $CO_2$ content | $H_2S/(H_2S + CO_2)$ mol. | Feed rate (gas) m³N/h | Feed rate (liquid) m³/h | T °C. |
|---|---|---|---|---|---|---|
| Gas 1 | 1.2% | 24.6% | 0.046 | 122 000 | — | 37° |
| Liquid 4' | 6.8 g/l | 159 g/l | 0.052 | — | 325 | 100° |
| Gas 7 | 65% | 35% | 0.650 | 2 100 | — | 102° |
| Gas 17 | — | — | 0.04 | 24 740 | — | 40° |
| Gas 7 + Gas 17 | — | — | — | 26 840 | — | — |
| Liquid 14 | 0.5 g/l | 0.2 g/l | 0.770 | — | 485 | 127° |
| Liquid 16 | 0.5 g/l | 0.2 g/l | 0.770 | — | 160 | 40° |
| Liquid 16' | 0.5 g/l | 0.2 g/l | — | — | 325 | " |
| Gas 3 | 10 vpm | 3.8% | $2.6 \times 10^{-4}$ | 95 160 | — | — |

EXAMPLE 2

Purification of a natural gas

This relates to a gas containing 0.33% $H_2S$, 7.67% $CO_2$ and 92% hydrocarbons.

The methyl-diethanolamine solution has a normality of 4.

The absorber 2 operates under a pressure of 77 bars and its base is at 53° C. This absorber comprises 12 plates.

TABLE 2

| FIG. 1 | $H_2S$ content | $CO_2$ content | $H_2S/(H_2S + CO_2)$ mol. | Feed rate (gas) m³N/h | Feed rate (liquid) m³/h | T °C. |
|---|---|---|---|---|---|---|
| Gas 1 | 0.33% | 7.67% | 0.0412 | 98 925 | — | 35 |
| Liquid 4' | 6.26 g/l | 74.6 g/l | 0.098 | — | 80 | 102 |
| Gas 7 | 40% | 60% | 0.40 | 750 | — | 102 |
| Gas 17 | — | — | 0.0115 | 2 580 | — | 38 |
| Gas 7 + Gas 17 | — | — | — | 3 330 | — | — |
| Liquid 14 | 0.4 g/l | 0.2 g/l | 0.72 | — | 135 | 128 |
| Liquid 16 | 0.4 g/l | 0.2 g/l | 0.72 | — | 55 | 38 |
| Liquid 16' | 0.4 g/l | 0.2 g/l | 0.72 | — | 80 | 38 |
| Gas 3 | 3 vpm | 4.8% | $6 \times 10^{-5}$ | 95 590 | — | 38 |

As can be seen from Table 2, the purification is very intensive, because there is no more than 3 vpm in the gas leaving at 3. It is interesting to note that, starting with an initial gas containing 0.33% $H_2S$, 40% is obtained in the final gas.

EXAMPLE 3

Purification of a natural gas

This natural gas, different from that of Example 2, contains 0.25% $H_2S$, 25% of $CO_2$ and 74.75% of hydrocarbons. Despite the low initial $H_2S$ content, 40% of this compound is obtained in the fraction withdrawn at 7, which permits its use in the manufacture of sulphur by the CLAUS process.

The absorber 2 operates at 80 bars and comprises 14 plates. The normality of the methyl-diethanolamine solution was 4.2.

It is interesting to see that the volume of the fraction withdrawn at 7 can be calculated from the enrichment desired. The ratio $H_2S:(CO_2+H_2S)$ in the liquid 4' was 0.019; to attain 40%, it is necessary to effect an enrichment of $0.4:0.019=21$ times; it is thus necessary to divide the feed rate of $CO_2+H_2S$ contained in the liquid 4' by 21. The feed rate of the acid gas at 4' was 5231 m³/hr. By dividing 5231 by 21, 249 m³/hr. is obtained.

Table 3 shows that this result has been obtained effectively with 250 m³/hr, which constitutes an excellent approximation for the process according to the invention.

TABLE 3

| FIG. 1 | $H_2S$ content | $CO_2$ content | $H_2S/(H_2S + CO_2)$ mol. | Feed rate (gas) m³N/h | Feed rate (liquid) m³/h | T °C. |
|---|---|---|---|---|---|---|
| Gas 1 | 0.25% | 25% | 0.0099 | 40 360 | — | 40 |
| Liquid 4' | 1.26 g/l | 84 g/l | 0.019 | — | 120 | 96 |
| Gas 7 | 40% | 60% | 0.40 | 250 | — | 100 |
| Gas 17 | — | — | 0.0029 | 4 980 | — | 25 |
| Gas 7 + Gas 17 | — | — | — | 5 230 | — | — |
| Liquid 14 | 0.6 g/l | 0.3 g/l | 0.72 | — | 300 | 127 |
| Liquid 16 | 0.6 g/l | 0.3 g/l | 0.72 | — | 180 | 25 |
| Liquid 16' | 0.6 g/l | 0.3 g/l | 0.72 | — | 120 | 25 |
| Gas 3 | 4 vpm | 14.6% | $2.7 \times 10^{-5}$ | 35 130 | — | 25 |

EXAMPLE 4

The acid gas treated was derived by scrubbing a natural gas by the process of total deacidification with diethanolamine. It contains 99.32% $CO_2$ and 0.68% $H_2S$. The absorber 2 operates under a pressure of 2 bars absolute and comprises 8 plates. The normality of the methyldiethanolamine employed as absorbent is 4. The operative conditions and results are given in Table 4. It can be seen there that, purified once, the gas contains only 100 vpm of $H_2S$ (outlet 3) and the gas withdrawn at 7 contains b 85% $H_2S$; to obtain this considerable enrichment, only 5% of the total gaseous feeds discharging at 7 and 17 are withdrawn.

EXAMPLES 5 to 13

Acid gases of various $H_2S$ and $CO_2$ contents have been treated as in the foregoing Examples: by varying the percentage of gas withdrawn at 7, the $H_2S$ content of the final gas so recovered is determined.

Table 5 combines the results obtained with 4 different $H_2S$ concentrations in the liquid leaving the absorber 2 via 4.

In the table, the following symbols are employed:
$[H_2S]\%$; % moles $H_2S$ in the total $H_2S+CO_2$ absorbed by the methyl-diethanolamine;
$[CO_2]\%$: % moles $CO_2$ in the same total;
100 $Q_7/(Q_7+Q_{17})$: gaseous stream withdrawn at 7, expressed as a % of the total gaseous stream, $Q_7+Q_{17}$, leaving at 7 and 17, the latter corresponding to the total feed rate of the acid gases contained in the absorbent to be regenerated introduced via 4';
$H_2S\%GA$: % of $H_2S$ in the stream $Q_7$ of enriched gas withdrawn at 7.

TABLE 4

| FIG. 1 | $H_2S$ content | $CO_2$ content | $H_2S/$ $(H_2S+$ $CO_2)$ mol. | Feed rate (gas) m³N/h | Feed rate (liquid) m³/h | T °C. |
|---|---|---|---|---|---|---|
| Gas 1 | 0.68% | 99.32% | 0.0068 | 2 181 | — | 40 |
| Liquid 4' | 2.78 g/l | 79.81 g/l | 0.043 | — | 8 | 100 |
| Gas 7. | 85% | 15% | 0.85 | 17 | — | 105 |
| Gas 17 | — | — | 0.017 | 323 | — | 40 |
| Gas 7 + Gas 17 | — | — | — | 340 | — | — |
| Liquid 14 | 0.65 g/l | 0.31 g/l | 0.73 | — | 20 | 129 |
| Liquid 16 | 0.65 g/l | 0.31 g/l | 0.73 | — | 12 | 40 |
| Liquid 16' | 0.65 g/l | 0.31 g/l | 0.73 | — | 8 | 40 |
| Gas 3 | 100 vpm | 99.99% | $10^{-4}$ | 1 841 | — | 40 |

TABLE 5

| Ex No | $[H_2S]$ % | $[CO_2]$ % | 100 $Q_7$:$(Q_7 + Q_{17})$ | $H_2S$ % GA |
|---|---|---|---|---|
| 5 | 4.3 | 95.7 | 15 | 25 |
| 6 | " | " | 8 | 52 |
| 7 | " | " | 5 | 73 |
| 8 | 9.8 | 90.2 | 50 | 19 |
| 9 | " | " | 30 | 31 |
| 10 | " | " | 15 | 56 |
| 11 | 23.8 | 76.2 | 65 | 36 |
| 12 | " | " | 50 | 47 |
| 13 | " | " | 37 | 60 |

This means that the final contents, in $H_2S\%$, in the gas ($H_2S\%GA$) leaving at 7, vary in inverse proportion to the percentage of gas withdrawn $100Q_7$:$(Q_7+Q_{17})$.

The data in Table 5, as well as the other results taken from a series of similar tests, are shown graphically in FIG. 2: they form a series of curves A, B, C, D, E, F, G and H plotted for the $[H_2S]\%$ contents respectively of 31.4, 25.08, 23.8, 9.8, 5.2, 4.3, 1.9, and 0.92 in the absorption liquid entering the regenerator. These curves, which form part of the invention, provide a suitable practical means for determining in advance, without experiments which are always costly industrially, the proportion of gases to be withdrawn at 7 in order to obtain the desired $H_2S$ content.

The information in the curves A to G of FIG. 2 is shown in another form by a series of lines in FIG. 3:
the abscissae are the $[H_2S]\%$ in the liquid leaving the primary absorber 2;
the ordinates are the % proportions of the gas to be withdrawn at 7, that is $100Q_7$:$(Q_7+Q_{17})$;
each line corresponds to a desired $H_2S$ concentration in the gas withdrawn.

Thus, for example, if a gas containing 40% $H_2S$ is desired, although a liquid containing 20% $H_2S+80\%$ $CO_2$ is available or $H_2S/(H_2S+CO_2)=0.2$, (abscissa 20), 48.2% of the total gas $Q_7+Q_{17}$ can be withdrawn. If under the same conditions a final gas of 70% $H_2S$ is desired, only 28.3% can be withdrawn.

The slope of each of the lines 30, 40, 50 etc. allows rapid determination of the proportion of gas withdrawn not to be exceeded, in order to obtain the desired $H_2S$ concentration in the final gas. Thus for example, in order to have in this gas 30% $H_2S$ or more, the ratio $$[100Q_7{:}(Q_7 + Q_{17})]{:}[H_2S] \% \quad \text{(FIG. 3)}$$

ordinate      abscissa should not exceed 3.05.

If more than 40% $H_2S$ is desired in $Q_7$, this ratio must be lower than 2.4.

As with the foregoing, the graph of FIG. 3 forms part of the invention as a new means for regulating operation of the apparatus for the enrichment of gases in hydrogen sulphide.

We claim:

1. Improvement in the enrichment of a gas in hydrogen sulphide, comprising selective absorption by a liquid in a primary absorption zone by contacting gas containing $H_2S$ with an absorbent liquid, regeneration of the liquid by heating and/or stripping by an inert gas with liberation of the gases absorbed and recovery of a fraction of the liberated gases, the remainder of the liberated gases being subjected to a second absorption in a secondary absorption zone by a new or regenerated absorbent liquid identical with that utilized in the primary absorption zone, characterized in that the steps of regeneration and secondary absorption are effected in a common operative zone in which there occur simultaneously: introduction of the liquid from the primary absorption, movement of the gases liberated during regeneration for said recovery and for contact with absorbent liquid, flow of the liquid derived from the secondary absorption and discharge from said operative zone of a fraction of the liberated gases enriched in $H_2S$.

2. Improvement according to claim 1, characterized in that the liquid used for the secondary absorption mixes with the contents of the regeneration zone over the whole cross-section of the latter or over a large proportion of this cross-section.

3. Improvement according to claim 1 or 2, characterized in that the amount of the fraction of gas discharged is substantially equal to 1/n of the amount, $H_2S+CO_2$, contained in the absorbent liquid discharging from the primary absorption zone, when the molar ratio $H_2S$:$(H_2S+CO_2)$ desired is n times greater than the corresponding ratio in the absorbent liquid discharging from the primary absorption zone.

4. Improvement according to claim 1, characterized in that the amount of the fraction of the final gas discharged, as a percentage of the amount of gas liberated during regeneration, is predetermined as a function of the desired $H_2S$ percentage content in the final gas, for various concentrations of $H_2S$ in the liquid derived from the primary absorption, by means of the graph of FIG. 2.

5. Improvement according to claim 1, characterized in that the amount of the fraction of the final gas discharged, as a percentage of the amount of gas liberated during regeneration, is predetermined as a function of the desired $H_2S$ percentage content in the gas withdrawn, for various concentrations of $H_2S$ in the liquid derived from the final absorption, by means of the graph of FIG. 3.

6. Improvement according to claim 1, characterized in that the amount of the fraction of the final gas discharged, as a percentage of the amount of gas liberated during regeneration, is regulated in such a way that this percentage, divided by the percentage of $H_2S$ in the gases, $CO_2+H_2S$, present in the absorbent after the first absorption, does not exceed 3.05 when 30% or more $H_2S$ is desired in the final gas and that it is lower than 2.4 if the final gas is to contain more than 40% $H_2S$.

7. Apparatus for carrying out the improved process according to claim 1, which comprises at least one primary absorber, a regenerator and a second absorber, first duct means for transferring the absorbent liquid from the base of the primary absorber to the head of the regenerator, second duct means for passing the regenerated absorbent from the base of the regenerator to the top of the two absorbers, a gas outlet at the top of each absorber and a withdrawal means which is adjustable for the final gas, at the top of the regenerator, characterized in that the interior space of the secondary absorber is located directly above that of the regenerator, from an intermediate point situated adjacent the juncture of the first duct means thereto and the withdrawal means for the final gas.

8. Apparatus according to claim 7, characterized in that the secondary absorber and the regenerator are mutually adjacent over the whole of their transverse cross-section.

9. Apparatus according to claim 7 or 8, characterized in that the level of the withdrawal means for the final gas is adjacent the level of said juncture of the first duct means and the regenerator and these two levels are adjacent that where the action of the secondary absorber commences.

10. Apparatus according to claim 9, characterized in that the regenerator and secondary absorber contain plates, the withdrawal means is at the level of the last regeneration plate, and the level of said juncture is at the first plate of the secondary absorber and situated immediately above the last plate of the regenerator.

* * * * *